US008381626B2

(12) United States Patent
Marsic et al.

(10) Patent No.: US 8,381,626 B2

(45) Date of Patent: Feb. 26, 2013

(54) LOCKABLE HINGE FOR A SAW BLADE GUARD

(75) Inventors: Martin D. Marsic, Highland Hts., OH (US); Dennis Minut, Brunswick Hills, OH (US)

(73) Assignee: Diamond Products, Limited, Elyria, OH (US)

( * ) Notice: Subject to any disclaimer, the term of this patent is extended or adjusted under 35 U.S.C. 154(b) by 282 days.

(21) Appl. No.: 12/753,928

(22) Filed: Apr. 5, 2010

(65) Prior Publication Data

US 2010/0251871 A1 Oct. 7, 2010

Related U.S. Application Data

(60) Provisional application No. 61/166,794, filed on Apr. 6, 2009.

(51) Int. Cl.

*E05D 11/10* (2006.01)
*B23D 47/00* (2006.01)
*B23P 11/00* (2006.01)
*B27G 19/02* (2006.01)

(52) U.S. Cl. .............. 83/860; 29/426.1; 16/319; 16/348

(58) Field of Classification Search .............. 83/13, 860, 83/478, 477.2; 29/426.1; 16/319, 348

See application file for complete search history.

(56) References Cited

U.S. PATENT DOCUMENTS

| | | | | |
|---|---|---|---|---|
| 2,522,006 | A * | 9/1950 | Wilcox | 30/124 |
| 3,448,486 | A * | 6/1969 | Wright | 16/324 |
| 3,684,255 | A * | 8/1972 | Rossi | 366/49 |
| 4,447,953 | A * | 5/1984 | Lombardino et al. | 30/382 |
| 4,840,431 | A | 6/1989 | Jedick | |
| 5,531,147 | A * | 7/1996 | Serban | 83/478 |
| 5,711,053 | A * | 1/1998 | Hafner | 16/380 |
| 5,724,956 | A | 3/1998 | Ketterhagen | |
| 6,318,353 | B1 | 11/2001 | Edwards et al. | |
| 7,645,183 | B2 | 1/2010 | Marques et al. | |
| 2008/0163492 | A1* | 7/2008 | Johansson | 30/124 |
| 2010/0043767 | A1 | 2/2010 | Marsic et al. | |

* cited by examiner

*Primary Examiner* — Ghassem Alie

(74) *Attorney, Agent, or Firm* — Rankin, Hill & Clark LLP

(57) ABSTRACT

A lockable hinge assembly for a blade guard includes a first hinge member secured to a first blade guard portion and a second hinge member secured to a second blade guard portion and rotatably secured to the first hinge member. A lock mechanism is provided so as to lock the second hinge member in a predetermined rotational orientation relative to the first hinge member. As such, the second hinge member and second blade guard portion can be locked in a predetermined position relative to the first hinge member and first blade guard portion, respectively.

16 Claims, 6 Drawing Sheets

LOCKABLE HINGE FOR A SAW BLADE GUARD

BACKGROUND

The present disclosure relates to a lockable hinge for a saw blade guard, particularly to a lockable hinge for a circular saw blade guard, and more particularly to a lockable hinge for a green circular saw blade guard.

It is well established that saws having circular blades (hereinafter, "circular saws") present a danger to operators. Namely, any contact by the operator with the saw blade while the saw blade is rotating can cause serious injury. To remedy the danger associated with circular saw blades, blade guards are disposed over an exposed portion of the circular blade.

Generally, blade guards are mounted over the circular saw blade to cover an upper portion of the circular blade. The upper portion of the circular blade is the portion that is not in placed in contact with a surface or article that is to be cut. To allow for servicing or replacement of the circular blade, blade guards may employ a second blade guard portion hingedly or rotatably secured to a first blade guard portion that is rigidly secured to a frame of the circular saw. Such a configuration allows for the blade guard to be opened and closed by rotating the second blade guard portion, about a hinge, relative to the first blade guard portion.

Heavy circular saws, such as green saws for cutting wet concrete, have large circular blades that may require a blade guard formed of a thick metal. In such assemblies, the blade guard may be very heavy, and as such may present a risk to an operator when opened. Nevertheless, conventional blade guard hinges do not secure the second blade guard portion when the second blade guard portion is in the opened position, e.g., rotated upward, relative to the first blade guard portion.

SUMMARY

In view of the above background, a lockable hinge for a saw blade guard is provided herein. According to one aspect, the lockable hinge includes a first hinge member adapted to be attached to a first blade guard portion, a second hinge member adapted to be attached to a second blade guard portion, and a lock mechanism. The second hinge member is rotatably secured to the first hinge member so that the second blade guard portion is rotatable relative to the first blade guard portion. The lock mechanism is configured to lock the second hinge member in a predetermined rotational orientation relative to the first hinge member.

According to another aspect, a blade guard for a circular saw includes a first blade guard portion, a second blade guard portion, and a lockable hinge assembly rotatably securing the first blade guard portion to the second blade guard portion. The lockable hinge assembly comprises a first hinge member attached to the first blade guard portion, a second hinge member attached to the second blade guard portion and rotatably secured to the first hinge member, and a locking mechanism. The locking mechanism is configured to lock the second hinge member in a predetermined rotational orientation relative to the first hinge member so as to lock the second blade guard portion in the predetermined rotational orientation relative to the first blade guard portion.

According to yet another aspect, a method for opening a blade guard for a circular saw blade is provided. The method includes rotating a first blade guard portion, that is rotatably attached to a second blade guard portion, about a hinge and into an open position. The first blade guard portion is then locked in the open position relative to the second blade guard portion using a locking mechanism provided on the hinge.

BRIEF DESCRIPTION OF THE DRAWINGS

The lockable hinge for a circular saw blade will be described with reference to the following figures, wherein.

DETAILED DESCRIPTION

Figure 1:
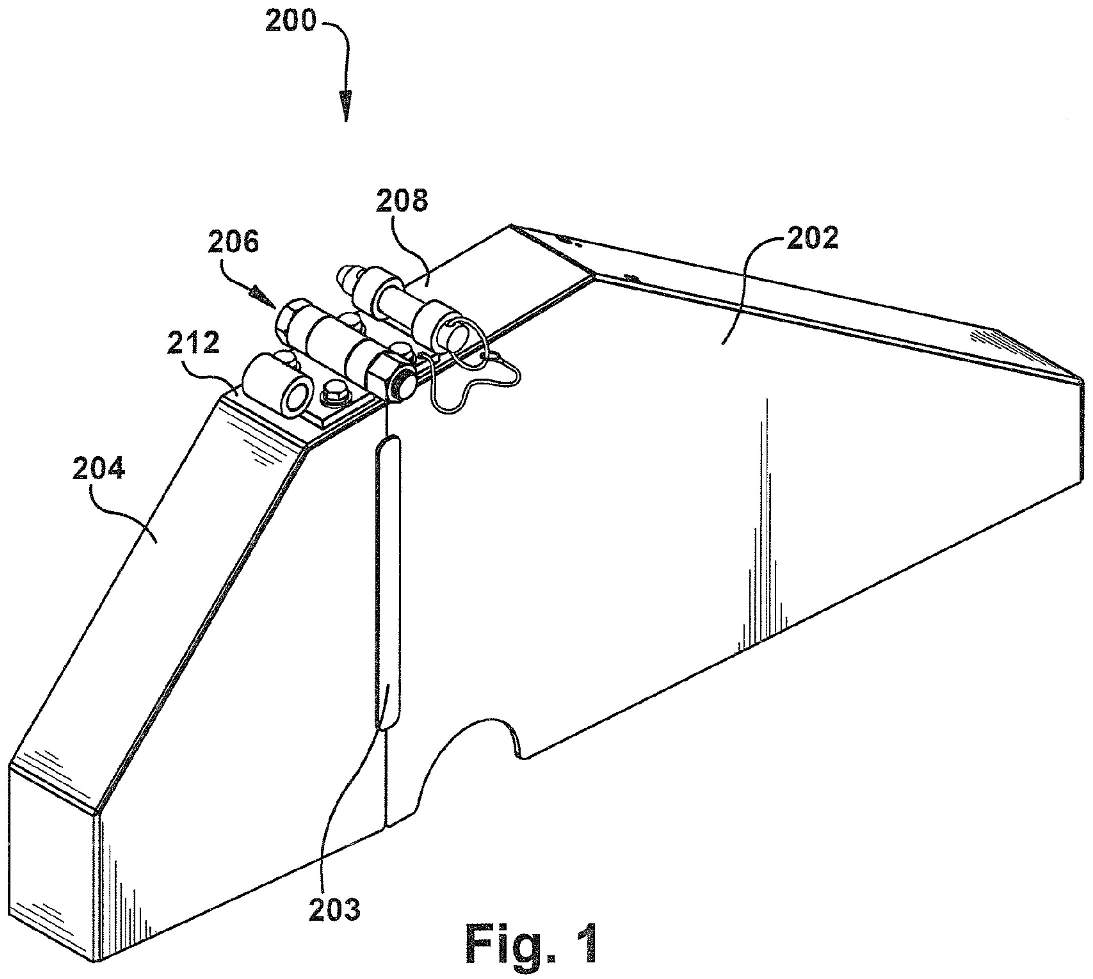
FIG. 1 is a perspective view of a blade guard and lockable hinge in a closed rotational orientation or position.

A description of a lockable hinge for a saw blade guard, particularly a circular saw blade guard, is provided with reference to the appended figures. The description with reference to the figures is made to exemplify the lockable hinge assembly and to simplify the description thereof. Reference to the figures is not intended to limit the scope of the appended claims.

With initial reference to FIGS. 1 and 2, a blade guard 200 for a circular saw (not shown) is illustrated as having a first or rear blade guard portion 202 (hereinafter, "rear portion 202"), a second or front blade guard portion 204 (hereinafter, "front portion 204"), and a lockable hinge assembly 206 (hereinafter, "hinge assembly 206") hingedly or rotatably securing the rear portion 202 and the front portion 204. The rear portion 202 is rigidly or stationarily attached to a circular saw frame (not shown) such that a portion of a circular saw blade (not shown), such as an upper portion, is held within and is covered by the blade guard 200.

The blade guard 200 is a member that covers a portion of a saw blade, particularly a circular saw blade. The blade guard 200 illustrated in FIGS. 1 and 2, and described below, serves as a cover around a portion of the circular saw blade. Specifically, the blade guard 200 is a housing that defines a circular saw blade receiving opening configured to receive and cover an upper or inactive edge, as well as two opposed side faces in the vicinity thereof, of the circular saw blade. A lower or active edge of the circular saw blade, as well as the opposed side faces in the vicinity thereof, are uncovered or exposed to allow for sawing or cutting. Accordingly, the circular saw blade can be operated to cut or saw an article or surface using the active edge, while the inactive edge is covered so as to protect an operator and the circular saw blade.

The rear blade guard portion 202 has a pair of frustotriangular shaped parallel sidewalls connected by a planar top surface 208, an angled surface extending diagonally downward from a rear edge of the top surface 208, and a back wall extending vertically downward from a rear edge of the angled surface. A blade receiving opening 210 is defined by inner surfaces of the sidewalls, the top surface 208, the angled surface, and the back wall. An upside-down "U"-shaped front of the rear blade guard portion 202 is defined by rear edges of the sidewalls and top surface 208.

The front blade guard portion 204 also has frustotriangular shaped parallel sidewalls connected by a planar top surface 212, an angled surface extending diagonally downward from a front edge of the top surface 212, and a front wall extending vertically downward from a front edge of the angled surface. A blade receiving opening 214 is defined by inner surfaces of the sidewalls, the top surface 212, the angled surface, and the front wall. An upside-down "U"-shaped rear of the front blade guard portion 204 is defined by front edges of the sidewalls and top surface 212.

The rear blade guard portion 202 and front blade guard portion 204 cooperate to define a single blade receiving space, comprising the rear and front blade receiving openings 210, 214. To define the single blade receiving opening 210, 214, the "U"-shaped front of the rear blade guard portion 202 is brought into contact with the "U"-shaped rear of the front blade guard portion 204 so the rear blade guard receiving opening 210 communicates with the front blade guard receiving opening 214. To facilitate the enclosure of a single blade receiving opening 210, 214, the "U"-shaped front of the rear blade guard portion 202 may be dimensioned identically to the "U"-shaped rear of the front blade guard portion 204. Specifically, the rear blade guard portion top surface 208 and the front blade guard portion top surface 212 can be provided with identical width dimensions, and the side walls of the rear blade guard potion 202 and the front blade guard portion 204 can be provided with identical height dimensions.

FIG. 1 illustrates the blade guard 200 in a closed position, wherein the rear blade guard portion 202 and the front blade guard portion 204 are brought together at their respective "U"-shaped front and rears such that the front edges of the rear blade guard portion top surface 208 and sidewalls are in contact with the rear edges of the front blade guard portion top surface 212 and sidewalls. To facilitate engagement between the rear blade guard portion 202 and the front blade guard portion 204 when in the closed position, the front edges of the rear blade guard portion 202 sidewalls have clamping guides 203 formed thereon. The clamping guides 203 define indents configured to receive and hold the edges of the sidewalls of the front blade guard portion 204.

The rear blade guard portion 202 and the front blade guard portion 204 are held together by the hinge assembly 206. Specifically, a first or rear hinge member 216 is attached to the rear blade guard top surface 208, a second or front hinge member 218 is attached to the front blade guard top surface 212, and the rear hinge member 216 is rotatably secured to the front hinge member 218 through a pivot mechanism or bolt 220. Through the hinge assembly 206, the respective U-shaped front and rear of the rear blade guard portion 202 and the front blade guard portion 204 can be held together in the closed position, shown in FIG. 1. Further, the front blade guard portion 204 is rotatable relative to the rear blade guard portion 202, about the hinge assembly pivot bolt 220, to an opened position, shown in FIG. 2.

By allowing the front blade guard portion 204 to rotate to the opened position relative to the rear blade guard portion 202, the circular saw blade is made accessible for servicing. Specifically, when the front blade guard portion 204 is in an opened rotational orientation (the opened position), the circular saw blade, including the active and inactive edges, is exposed and accessible. Upon completion of servicing, or prior to active use for cutting or sawing, the front blade guard portion 204 is rotated to a closed rotational orientation, wherein the inactive portion of the circular saw blade is covered.

In addition to allowing the front blade guard portion 204 to rotate relative to the rear blade guard portion 202, the hinge assembly 206 is operable to lock or secure the front blade guard portion 204 in a predetermined rotational orientation relative to the rear blade guard portion 202. As illustrated in FIG. 2, the predetermined rotational orientation can be the opened rotational orientation corresponding to the opened position. The ability to lock the front blade guard portion 204 in a predetermined rotational orientation relative to the rear blade guard portion 202 can be useful as a safety feature, especially when used with a heavy circular saw having a blade guard formed of a heavy or thick metal. Particularly, the locking ability of the hinge assembly 206 can prevent a heavy front blade guard portion 204 from crashing down from the opened rotational orientation.

Figure 3:
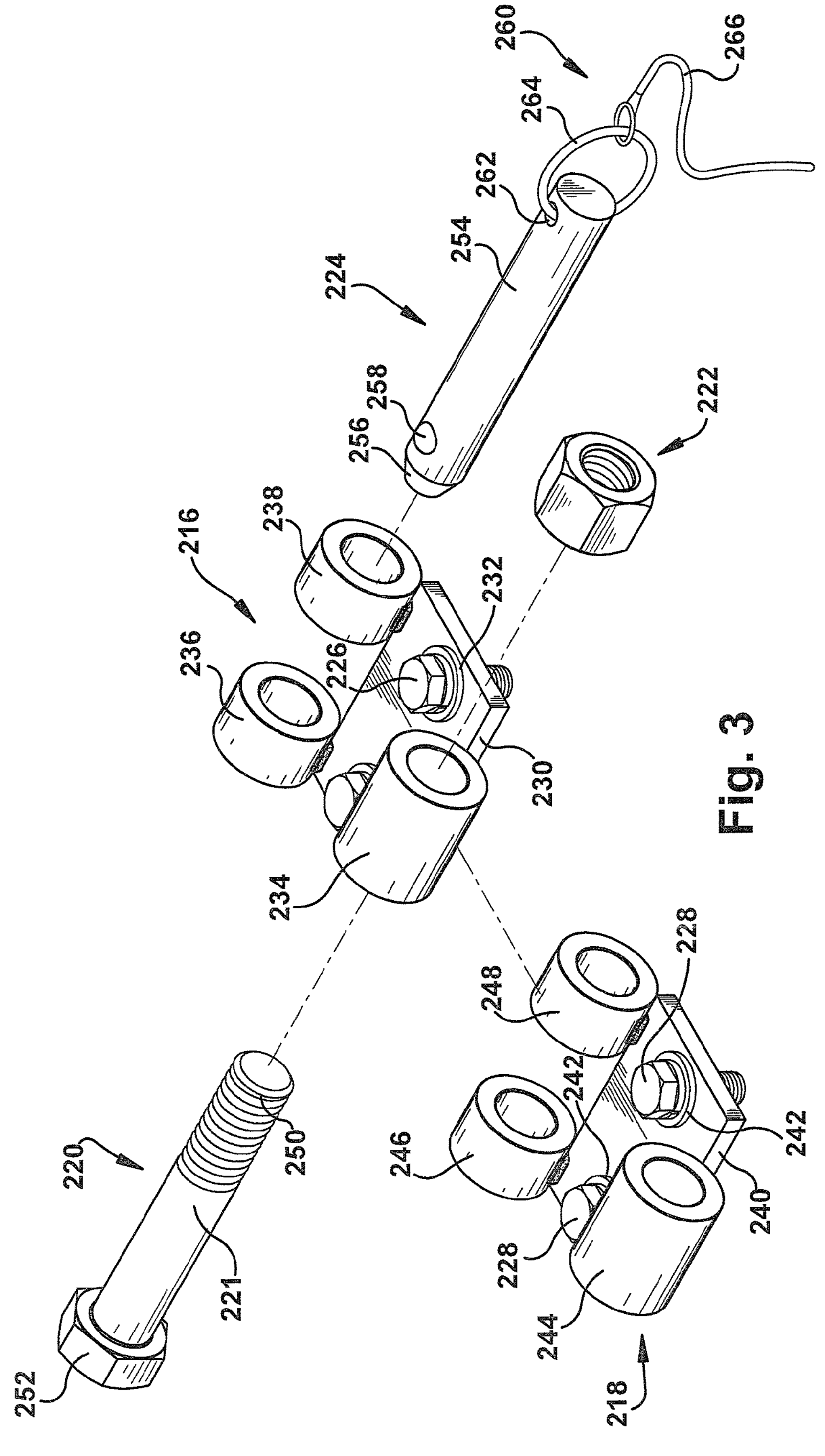
FIG. 3 is an exploded perspective view illustrating the lockable hinge.
Figure 4A:
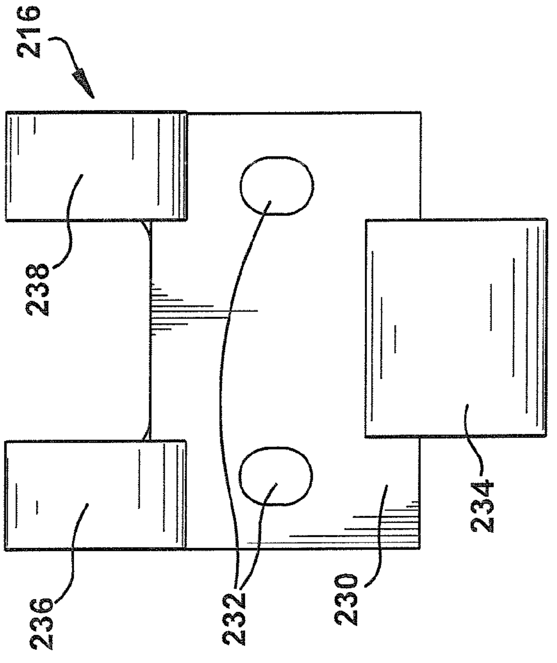
FIG. 4A is a plan view of a first hinge member of the lockable hinge.
Figure 4B:
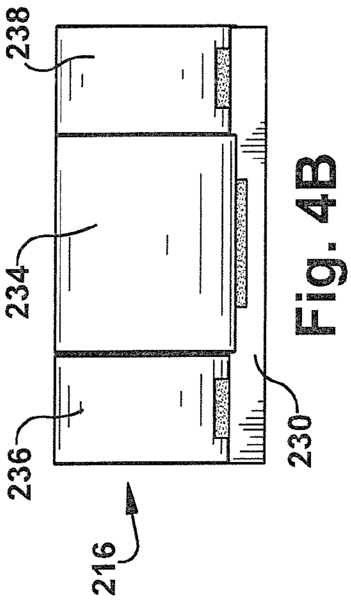
FIG. 4B is a front view of the first hinge member of the lockable hinge.
Figure 4C:
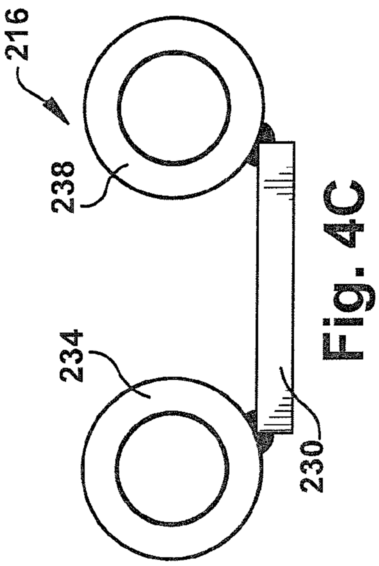
FIG. 4C is a side view of the first hinge member of the lockable hinge.
Figure 4D:
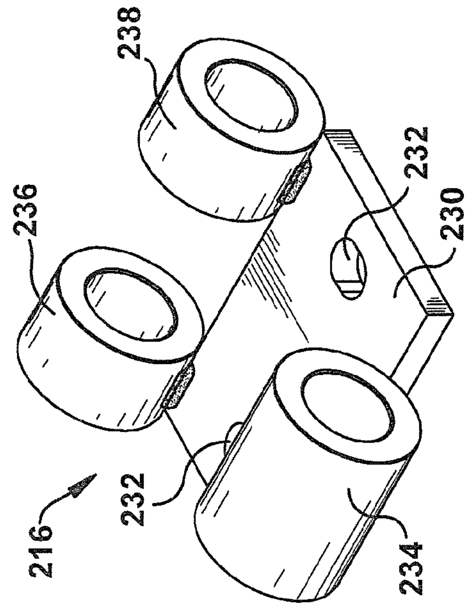
FIG. 4D is a perspective view of the first hinge member of the lockable hinge.
Figure 5D:
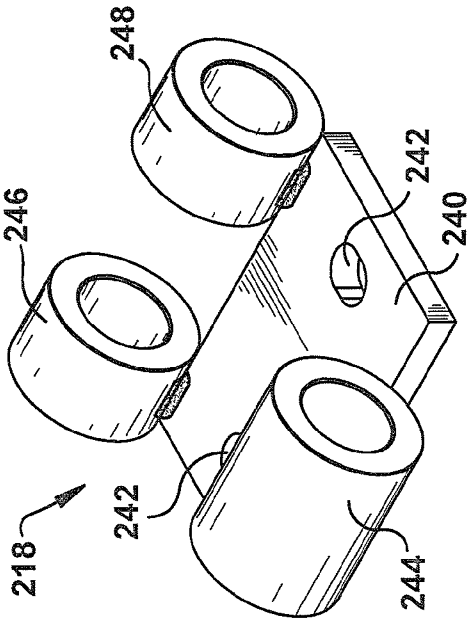
FIG. 5D is a perspective view of the second hinge member.
Figure 5C:
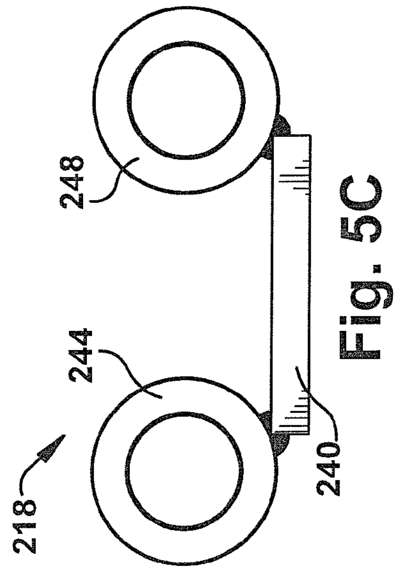
FIG. 5C is a side view of the second hinge member of the lockable hinge.
Figure 5A:
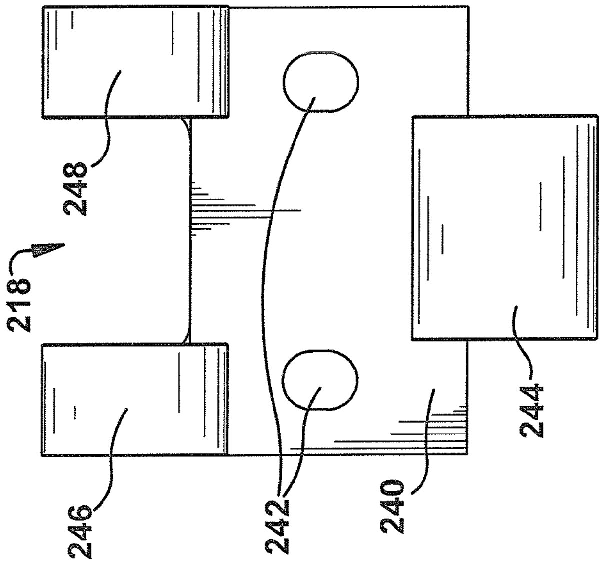
FIG. 5A is a plan view of a second hinge member of the lockable hinge.
Figure 5B:
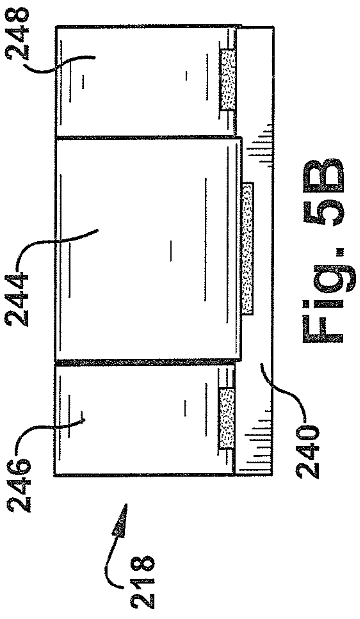
FIG. 5B is a front view of the second hinge member of the lockable hinge.

The hinge assembly 206, as shown in FIG. 3, includes the rear hinge member 216, the front hinge member 218, the pivot bolt 220 rotatably securing the rear hinge member 216 to the front hinge member 218, and a lock mechanism or lock pin assembly 224 (hereinafter, "lock pin 224) configured to lock the rear and front hinge members 216, 218 in a predetermined rotational orientation relative to each other. As will be described in further detail below, the hinge assembly 206 illustrated in FIG. 3 also includes a lock nut 222 for securing the pivot bolt 220, rear hinge member securing articles 226 for attaching the rear hinge member 216 to the rear blade guard portion 202, and front hinge member securing articles 228 for attaching the front hinge member 218 to the front blade guard portion 204.

With reference to FIGS. 3 and 4A-4D, the rear hinge member 216 is formed of a rear hinge plate 230 having a pair of blade guard securing holes 232 defined therethrough, a large connecting knuckle 234 extending from a front end of the rear hinge plate 230, a first small lock knuckle 236 extending from a rear end of the rear hinge plate 230, and a second small lock knuckle 238 extending from the rear end of the rear hinge plate 230 and spaced from the first small lock knuckle 236. As used herein, the "rear end" of the rear hinge plate 230 is an upper end shown in FIG. 4A, the "front end" of the rear hinge plate 230 is a lower end shown in FIG. 4A, a length direction extends between the rear and upper ends of the rear hinge plate 230, and a width direction extends perpendicularly to the length direction across the rear hinge plate 230.

The rear hinge plate 230 is a generally rectangular, planar member supporting the large connecting knuckle 234 and the first and second small lock knuckles 236, 238, as well as having the blade guard securing holes 232 formed therethrough. The blade guard securing holes 232 are formed so as to be substantially centrally disposed in the length direction of the rear hinge plate 230, with each of the guard securing holes 232 disposed toward ends of the rear hinge plate 230 in width direction.

The large connecting knuckle 234 is an annular member having a hollow circular inner portion (an opening defined therethrough) defining an inner diameter. As mentioned above, the large connecting knuckle 234 is formed along the front end of the rear hinge plate 230, and is provided so as to extend outwardly (e.g., in a direction away from the rear end of the rear hinge plate 230) and upwardly from a generally central position (in the width direction). Further, as illustrated, the large connecting knuckle 234 has a greater width than the small lock knuckles 236, 238.

The small lock knuckles 236, 238 are also annular members having hollow circular inner portions (openings defined therethrough) defining inner diameters. Further, the small lock knuckles 236, 238 are formed along the rear end of the rear hinge plate 230, and are provided so as to extend outwardly (e.g., in a direction away from the front end of the rear hinge plate 230) and upwardly from respective end positions (in the width direction). Particularly, the first small lock knuckle 236 is provided such that an outside edge thereof is generally flush with a side edge of the rear hinge plate 230, and the second small lock knuckle 238 is provided such that an outside edge thereof is generally flush with an opposite side edge of the rear hinge plate 230. The inside edges of the small lock knuckles 236, 238 are spaced from each other.

With reference to FIGS. 3 and 5A-5D, the front hinge member 218 is formed of a front hinge plate 240 having a pair of blade guard securing holes 242 defined therethrough, a large lock knuckle 244 extending from a front end of the front hinge plate 240, a first small connecting knuckle 246 extending from a rear end of the front hinge plate 240, and a second small connecting knuckle 248 extending from the rear end of the front hinge plate 240 and spaced from the first small connecting knuckle 246. As used herein, the "rear end" of the front hinge plate 240 is an upper end shown in FIG. 5A, the "front end" of the front hinge plate 240 is a lower end shown in FIG. 5A, a length direction extends between the rear and upper ends of the front hinge plate 240, and a width direction extends perpendicularly to the length direction across the front hinge plate 240.

The front hinge plate 240 is a generally rectangular, planar member supporting the large lock knuckle 244 and the first and second small connecting knuckles 246, 248, as well as having the blade guard securing holes 242 formed therethrough. The blade guard securing holes 242 are formed so as to be substantially centrally disposed in the length direction of the front hinge plate 240, with each of the guard securing holes 242 disposed toward ends of the front hinge plate 240 in the width direction.

The large lock knuckle 244 is an annular member having a hollow circular inner portion (an opening defined therethrough) defining an inner diameter. As mentioned above, the large lock knuckle 244 is formed along the front end of the front hinge plate 240, and is provided so as to extend outwardly (e.g., in a direction away from the rear end of the front hinge plate 240) and upwardly from a generally central position (in the width direction). Further, as illustrated, the large lock knuckle 244 has a greater width than the small connecting knuckles 246, 248.

The small connecting knuckles 246, 248 are also annular members having hollow circular inner portions (openings defined therethrough) defining inner diameters. Further, the small connecting knuckles 246, 248 are formed along the rear end of the front hinge plate 240, and are provided so as to extend outwardly (e.g., in a direction away from the front end of the front hinge plate 240) and upwardly from respective end positions of the front hinge plate 240 (in the width direction). Particularly, the first small connecting knuckle 246 is provided such that an outside edge thereof is generally flush with a side edge of the front hinge plate 240, and the second small connecting knuckle 248 is provided such that an outside edge thereof is generally flush with an opposite side edge of the front hinge plate 240. The inside edges of the small connecting knuckles 246, 248 are spaced from each other.

When the rear hinge member 216 is rotatably secured to the front hinge member 218, the rear hinge member large connecting knuckle 234 is received between the front hinge member small connecting knuckles 246, 248. In this regard, the space between the inside edges of the small connecting knuckles 246, 248 has a width greater than that of the large connecting knuckle 234, though the difference may be minimal, as shown in FIGS. 1 and 2. Reference below to the "connecting knuckles 234, 246, 248" encompasses the large connecting knuckle 234, the first small connecting knuckle 246, and the second small connecting knuckle 248. When the connecting knuckles 234, 246, 248 are aligned, the openings defined through each combine to form a single, elongated annular opening. The openings can be provided with equal inner diameters, though the hinge assembly 206 is amenable to various inner diameters.

Figure 2:
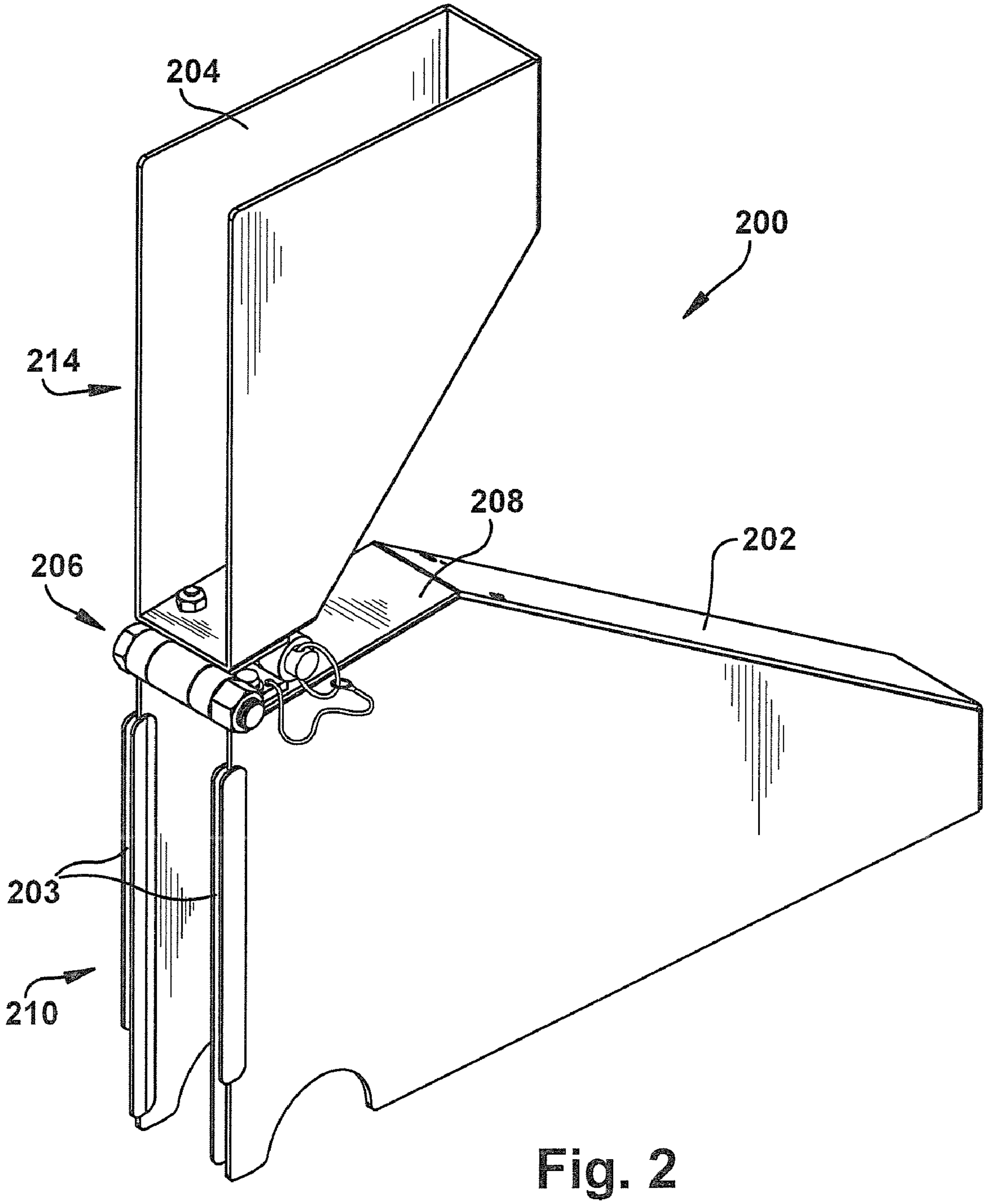
FIG. 2 is a perspective view of the blade guard and lockable hinge in an opened rotational orientation or position.

Similarly, the space between the inside edges of the rear hinge member small lock knuckles 236, 238 is greater than a width of the front hinge member large lock knuckle 244, though the difference may be minimal, as shown in FIGS. 1 and 2. As is explained below, when the front hinge member 218 is in the predetermined rotational orientation, e.g., the opened rotational orientation, relative to the rear hinge member 216, the large lock knuckle 244 is received between the small lock knuckles 236, 238. Reference below to the "lock knuckles 236, 238, 244" encompasses the first small lock knuckle 236, the second small lock knuckle 238, and the large lock knuckle 244. When the lock knuckles 236, 238, 244 are aligned, the openings defined through each combine to form a single, elongated annular opening. The openings can be provided with equal inner diameters, though the hinge assembly 206 is amenable to various inner diameters.

The rear hinge member 216 and the front hinge member 218 need not be identical to one another, though the hinge members 216, 218 can be identical to one another. By providing identical rear and front hinge members 216, 218, only one hinge part need be formed, with the one hinge part being usable as either the rear hinge 216 or the front hinge 218. Further, if one of the rear and front hinge members 216, 218 becomes worn, it can be switched with the other or replaced with any spare hinge member. Accordingly, a cost savings and efficiency improvement can be obtained.

The rear hinge member 216 is rotatably secured to the front hinge member 218 using the pivot bolt 220. As illustrated in FIG. 3, the pivot bolt 220 has a cylindrical shaft 221 with a capped end 252 and a threaded end 250 opposite the capped end 252. The cylindrical shaft 221 and the threaded end 250 threaded have a diameter that is less than, through preferably only slightly, the inner diameter of the single, elongated opening defined through the connecting knuckles 234, 246, 248. The capped end 252 has a diameter greater than that of the cylindrical shaft 221 and the single, elongated opening defined through the connecting knuckles 234, 246, 248. Further, a length of the cylindrical shaft 221 is greater than a width of the combined connecting knuckles 234, 246, 248, such that when the pivot bolt 220 is received in the opening defined through the connecting knuckles 234, 246, 248, the capped end 252 is exposed from one end (the capped end 252 cannot pass through the opening) and the threaded end 250 is simultaneously exposed from the other end.

The hinge assembly 206 is assembled by passing the cylindrical shaft 221 and threaded end 250 of the pivot bolt through the opening defined through the aligned connecting knuckles 234, 246, 248. The pivot bolt 220 is secured in the opening defined through the connecting knuckles 234, 246, 248 by the lock nut 222. The lock nut 222 has an inner, threaded opening configured to threadedly engage the pivot bolt threaded end

250, and an outer diameter greater than the inner diameter of the openings defined through the connecting knuckles 234, 246, 248. To ensure that the rear and front hinge members 216, 218 are rotatable relative to each other about the pivot bolt 220, the lock nut 222 should be tightened to secure the pivot bolt 220 in the connecting knuckles 234, 246, 248 opening without restricting the rotation of the rear and front hinge member 216, 218 relative to each other.

Once so assembled, the front hinge member 218 is rotatable relative to the rear hinge member 216. When surfaces of the front hinge plate 240 and the rear hinge plate 230 are substantially flush with one another, as shown in FIGS. 1 and 3, the front hinge member 218 is in the opened rotational orientation or opened position relative to the rear hinge member 216. Conversely, when the front hinge member 218 is rotated about the pivot bolt 220 such that the large lock knuckle 244 is received between the small lock knuckles 236, 238, the front hinge member 218 is in the predetermined rotational orientation corresponding to the opened rotational orientation or opened position. Though the hinge assembly 206 illustrated in FIGS. 1-3 shows the predetermined/opened rotational orientation as being a nearly maximum rotational orientation, this need not be the case. Rather, the predetermined rotational orientation or the opened rotational orientation can correspond to any rotational orientation.

When in the predetermined opened rotational orientation, the front hinge member 218 can be locked relative to the rear hinge member 216 using the lock mechanism or pin 224. The lock pin 224 comprises a cylindrical shaft 254 having a tapered head 356 at one end and a pull assembly 260 at an opposite end, with a ball detent 258 projecting from the cylindrical shaft 254 in a vicinity of the tapered head 256. The tapered head 256 is a frustoconical head extending from the end of the cylindrical shaft 254 and the ball detent 258 is spring biased to project radially outwardly from the cylindrical shaft 254. The pull assembly 260 includes a hole 262 formed through the cylindrical shaft 254 in the vicinity of the end of the cylindrical shaft 254 that is opposite the end to which the tapered head 256 is formed, a ring 264 that runs through the hole 262, and a wire 266 securing the ring 264 to one of the rear or front hinge plates 230, 240.

To lock the front hinge member 218 in the predetermined opened rotational orientation relative to the rear hinge member 216, the lock pin 224 is inserted through the opening defined through the lock knuckles 236, 238, 244, tapered head 256 first. The cylindrical shaft 254 of the lock pin 224 has a length such that the ball detent 258 is exposed from one end of the lock knuckles 236, 238, 244 while the pull assembly 260 is exposed from the other end of the lock knuckles 236, 238, 244. As the lock pin 224 is passing through the opening defined through the lock knuckles 236, 238, 244, the ball detent 258 is depressed into the cylindrical shaft 254. The spring biasing causes the ball detent 258 to project radially outward once the ball detent 258 is exposed from the lock knuckles 236, 238, 244. The lock pin 224, when received in the opening defined by the lock knuckles 236, 238, 244, serves to lock the front hinge member 218 relative to the rear hinge member 216. Further, the ball detent 258 and the pull assembly 260 operate to secure the lock pin 224 in the lock knuckles 236, 238, 244 until a sufficient pulling force is applied to the pull assembly 260.

The hinge assembly 206 is secured to the blade guard 200 so as to allow the front blade guard portion 204 to be rotated and locked in a predetermined opened rotational orientation relative to the rear blade guard portion 202. To secure the hinge assembly 206 to the blade guard 200, the rear and front hinge member securing articles 226, 228 are used. The rear and front hinge member securing articles 226, 228 can take any form of securing mechanism, such as mechanical fasteners or adhesives. As illustrated in FIGS. 1-3, the rear and front hinge member securing articles 226, 228 are a nut and bolt assembly. The bolts are threaded through the rear and front blade guard securing holes 232, 242 and corresponding openings formed through the rear and front blade guard portion top surfaces 208, 212, and secured using nuts threaded to the ends of the bolts. Through this engagement, the rear hinge member 216 is secured to the rear blade guard portion 202, the front hinge member 218 is secured to the front blade guard portion 204, and the front blade guard portion 204 is rotatably secured to the rear blade guard portion 202 by rotatably securing the rear hinge member 216 to the front hinge member 218 using the pivot bolt 220.

In operation, the hinge assembly 206 allows for rotatable and selectively lockable movement of the front blade guard portion 204 relative to the rear blade guard portion 202. As shown in FIG. 1, the front blade guard portion 204 is in the closed rotational orientation relative to the rear blade guard portion 202. To ensure that the lock pin 224 is not lost when in the closed position, the lock pin 224 is received in the openings defined through the small lock knuckles 236, 238 of the rear hinge member 216. When in the closed rotational orientation, the inactive portion of the circular blade is covered, and the circular saw is in a condition suitable for use (e.g., cutting or sawing).

To open the blade guard 200, beginning in the closed position shown in FIG. 1, the lock pin 224 is removed from the rear hinge member small lock knuckles 236, 238 by pulling on the pull assembly 260. The front blade guard portion 204 is then rotated relative to the rear blade guard portion 202, about the pivot bolt 220 of the hinge assembly 206, from the closed rotational orientation or position to the predetermined opened rotational orientation. When in the predetermined rotational orientation, or opened rotational orientation or position, the large lock knuckle 244 of the front hinge member 218 is received between the small lock knuckles 236, 238 of the rear hinge member 216 so that the openings defined through the lock knuckles 236, 238, 244 are aligned. The lock pin 224 is then passed through and received in the aligned openings of the lock knuckles 236, 238, 244, so as to lock the front hinge member 218 and the front blade guard portion 204 in the predetermined rotational orientation relative to the rear hinge member 216 and rear blade guard portion 202, respectively. The opened position is shown in FIG. 2.

As discussed above, the ball detent 258 and pull assembly 260 operate to secure the lock pin 224 in the lock knuckles 236, 238, 244. To return the front blade guard portion 204 to the closed rotational orientation, a pulling force must be applied to the pull assembly 260 so as to overcome the spring biasing force applied to the ball detent 258 such that the ball detent is pulled into the lock pin cylindrical shaft 254. The lock pin 224 is then removed from the lock knuckles 236, 238, 244, and the front blade guard portion 204 is rotated about the hinge assembly pivot bolt 220 relative to the rear blade guard portion 202 until in the position shown in FIG. 1, where the rear edges of the front blade guard portion 204 contact front edges of the rear blade guard portion 202. The lock pin 224 is then securely received in the rear hinge member small lock knuckles 236, 238. By holding the lock pin 224 therein while the blade guard is in the closed position, safe-keeping of the lock pin 224 is ensured. Further, the wire 266 attached to the lock pin ring 264 is secured to one of the rear hinge plate 230 (as shown) and the front hinge plate 240 as an additional loss-prevention means.

As an alternative mechanism to lock the front hinge member 218 and the front blade guard portion 204 in the predetermined opened rotational orientation relative to the rear hinge member 216 and the rear blade guard portion 202, a spring actuated lock pin assembly 268 can be used. As shown in FIG. 6A, the spring actuated lock pin assembly 268 is usable with the hinge assembly 206, particularly the rear hinge member 216. The spring actuated lock pin assembly 268 comprises a first pin member 270 elastically secured to the first small lock knuckle 246 and a second pin member 272 elastically secured to the second small lock knuckle 238.

The first and second pin members 270, 272 each include a shaft 274, 276 and a knob 278, 280. The shafts 274, 276 are sized so as to be received in the openings through the small lock knuckles 236, 238, and the knobs 278, 280 are sized larger than the openings through the small lock knuckles 236, 238. Spring mechanisms (not shown) secure the first and second pin members 270, 272 to the small lock knuckles 236, 238 such that the shafts 274, 276 are received in the openings through the small lock knuckles 236, 238 and the knobs 278, 280 are forced into abutting outside edges of the small lock knuckles 236, 238. Further, the inner ends of the shafts 274, 276, opposed to the knobs 278, 280, project from inside edges of the small lock knuckles 236, 238 when the knobs 278, 280 are abutting the outside edges of the small lock knuckles 236, 238.

Thus, when the large lock knuckle 244 is received between the small lock knuckles 236, 238, the first and second pin member 270, 272 are received in the opening of the large lock knuckle 244 and operate to lock the front hinge member 218 and front blade guard portion 204 relative to the rear hinge member 216 and rear blade guard portion 202. The rear and front hinge member 216, 218 can be unlocked from each other by pulling outwardly on the knobs 278, 280 such that the inner ends of shafts 274, 276 no longer project from inside edges of the small lock knuckles 236, 238. The front hinge member 218 and front blade guard portion 202 are then rotatable from the predetermined opened rotational orientation to the closed rotational orientation.

Figure 6B:
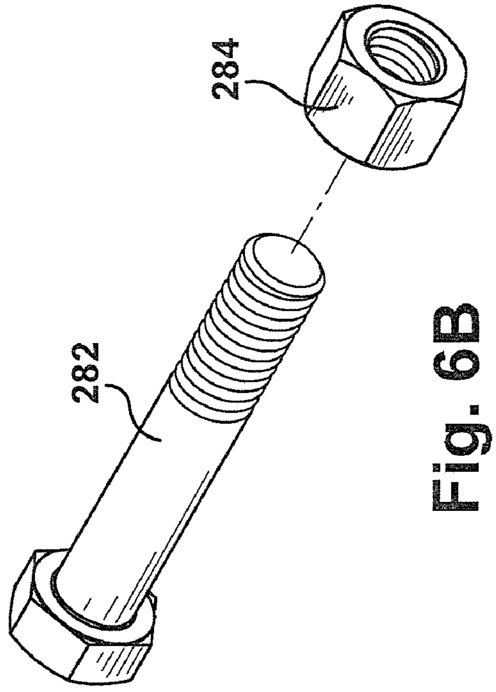
FIG. 6B is a perspective view of an alternative lock pin for a lockable hinge.
Figure 6A:
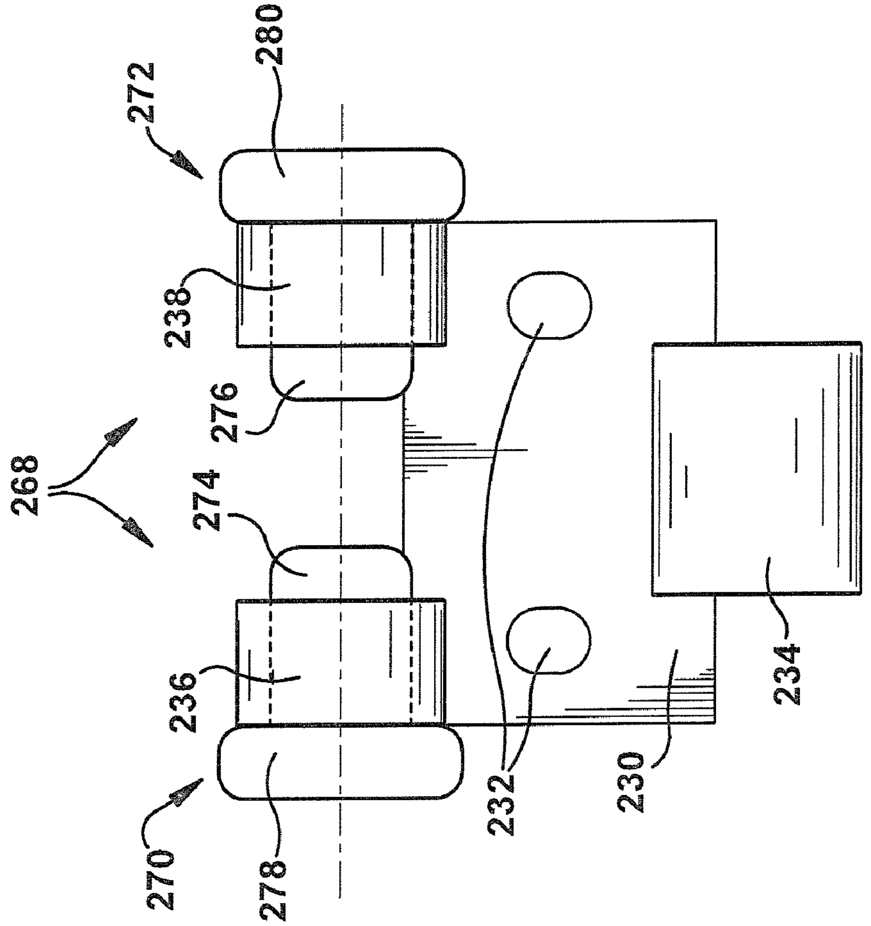
FIG. 6A is a plan view of an alternative first hinge member for a lockable hinge.

As an additional alternative, a lock screw 282 and nut 284, as shown in FIG. 6B, can be used in place of the lock pin 224. The lock screw 282 has a cylindrical shaft with an enlarged head at one end and a threaded end at the other. Accordingly, the lock screw 282 can be inserted through the openings of the small lock knuckles 236, 238, 244, and secured therein by threadedly engaging the nut 284 to the threaded end of the lock screw 282.

Additional alternative designs for the disclosed blade guard and hinge assembly are considered amenable to the present disclosure. For example, the blade guard can be provided for a non-circular saw blade, such as a straight blade. Further, the hinge assembly can secure a single blade guard member to a saw frame, with the entire blade guard being rotatable and lockable to open and expose a portion of a saw blade. Additionally, the number and placement of connecting and lock knuckles can be varied. Further, the openings defined through the knuckles need not be circular, as shown, nor does the lock pin need to be circular.

Various other modifications not explicitly described herein are also considered amenable to the blade guard and hinge assembly. To the extent practicable, certain modifications have been described. However, a person of ordinary skill in the art will readily understand that various additional modifications to the described embodiments can be practiced without straying from the scope of the invention. It will further be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A lockable hinge for a circular saw blade guard of a circular saw having a blade, comprising:

a first hinge member, including a first lock knuckle with a first opening defined therethrough, adapted to be secured to a first blade guard portion;

a second hinge member, including a second lock knuckle with a second opening defined therethrough, rotatably secured to the first hinge member and adapted to be secured to a second blade guard portion such that the second blade guard portion is rotatable relative to the first blade guard portion, wherein the first and second blade guard portions cover a portion of the blade, and a lock mechanism configured to lock the second hinge member in a predetermined rotational orientation relative to the first hinge member, comprising a lock pin sized to be received in the first and second openings;

wherein the first and second lock knuckles are provided so the first and second openings align when the second hinge member is in the predetermined rotational orientation relative to the first hinge member, and the lock pin is simultaneously receivable in the first and second openings of the first and second lock knuckles to lock the second hinge member in the predetermined rotational orientation relative to the first hinge member.

2. The lockable hinge according to claim 1, wherein the predetermined rotational orientation relative to the first hinge member is an opened rotational orientation.

3. The lockable hinge according to claim 1, wherein the lock mechanism further comprises a securing mechanism configured to secure the lock pin in the knuckle openings.

4. The lockable hinge according to claim 3, wherein the lock pin comprises a shaft having an insertion end and a pull end, and the securing mechanism is a detent that protrudes outwardly from the lock pin shaft, wherein a distance between the detent and the pull end of shaft is greater than a combined length of the first and second lock knuckles such that when the lock pin is received in the first and second openings, the detent is disposed outside of and to a first side of one of the first and second knuckles, and the pull end is disposed outside of and to a second side of the other of the first and second knuckles.

5. The lockable hinge according to claim 1, wherein the lock pin is secured to one of the first lock knuckle and the second lock knuckle by a spring means that biases an insertion end of the lock pin to pass through and project from the opening of the lock knuckle in a direction toward the other lock knuckle, so as to lock the hinge members in a predetermined rotational orientation relative to each other.

6. The lockable hinge according to claim 5, wherein the lock pin is provided such that the insertion end thereof is retracted into the lock knuckle so as to not project from the opening of the lock knuckle when an external pulling force is applied to a pull end thereof.

7. The lockable hinge according to claim 3, wherein the lock pin comprises a shaft having a head on a first end of the shaft and being threaded on a second end of the shaft, and the lock mechanism includes the threaded end of the shaft and a nut configured to threadedly engage the threaded end of the shaft, wherein a length of the shaft is set such that when received in the first and second openings of the first and second knuckles, the nut can be threadedly engaged with the threaded end of the shaft on a first side disposed outside of the opening of one of the first and second knuckles, while the head is disposed on a second side disposed outside of the opening of the other of the first and second knuckles.

8. The lockable hinge according to claim 1, wherein:

the first hinge member further comprises a plate, and a third lock knuckle having a third opening concentric with the first opening defined therethrough;

the second hinge member further comprises a plate, wherein the second lock knuckle is provided such that the second opening is concentric with the first and third openings when the second hinge member is in the predetermined rotational orientation relative to the first hinge member; and the lock pin is configured to be simultaneously received in the first, second, and third openings.

9. The lockable hinge according to claim 8, wherein the first and third lock knuckles are spaced from one another, and the second lock knuckle is provided to be received between the first and third lock knuckles when the second hinge member is in the predetermined rotational orientation.

10. The lockable hinge according to claim 8, wherein the lock pin comprises a first lock pin secured to the first lock knuckle by a spring means that biases an insertion end of the first lock pin to pass through and project from the first opening of the first lock knuckle in a direction toward the third lock knuckle, and a second lock pin secured to the third lock knuckle by a spring means that biases an insertion end of the second lock pin to pass through and project from the third opening of the third lock knuckle in a direction toward the first lock knuckle, such that the insertion ends of the lock pins are received in the second lock knuckle when in the predetermined rotational orientation.

11. A guard for a circular saw having a blade, comprising:

a first blade guard portion; a second blade guard portion, wherein the first and second blade guard portions cover a portion of the blade; and a lockable hinge assembly rotatably securing the second blade guard portion to the first blade guard portion, the lockable hinge assembly comprising:

a first hinge member, including a first lock knuckle with a first opening defined therethrough, attached to the first blade guard portion;

a second hinge member, including a second lock knuckle with a second opening defined therethrough, attached to the second blade guard portion and rotatably secured to the first hinge member, and a locking mechanism, comprising a lock pin sized to be simultaneously received in the first and second openings, configured to lock the second hinge member in a predetermined rotational orientation relative to the first hinge member so as to lock the second blade guard portion in the predetermined rotational orientation relative to the first blade guard portion;

wherein the first and second lock knuckles are provided such that the first and second openings align when the second hinge member and the second blade guard portion are in the predetermined rotational orientation relative to the first hinge member and first blade guard portion, respectively.

12. The blade guard according to claim 11, wherein the predetermined rotational orientation is an opened rotational orientation corresponding to an opened position of the blade guard.

13. The blade guard according to claim 11, wherein:

the first hinge member further comprises a plate attached to the first blade guard portion, and a third lock knuckle having a third opening concentric with the first opening defined therethrough;

the second hinge member further comprises a plate attached to the second blade guard portion, wherein the second lock knuckle is provided such that the second opening is concentric with the first and third openings when the second hinge member and second blade guard portion are in the predetermined rotational orientation relative to the first hinge member and first blade guard portion, respectively; and the lock pin configured to be simultaneously received in the first, second, and third openings.

14. The blade guard according to claim 13, wherein the first and third lock knuckles are spaced from one another, and the second lock knuckle is provided to be received between the first and third lock knuckles when the second hinge member and second blade guard portion are in the predetermined rotational orientation relative to the first hinge member and first blade guard portion, respectively.

15. The blade guard according to claim 13, wherein the lock pin comprises a first lock pin secured to the first lock knuckle by a spring means that biases an insertion end of the first lock pin to pass through and project from the first opening of the first lock knuckle in a direction toward the third lock knuckle, and a second lock pin secured to the third lock knuckle by a spring means that biases an insertion end of the second lock pin to pass through and project from the third opening of the third lock knuckle in a direction toward the first lock knuckle, such that the insertion ends of the lock pins are received in the second lock knuckle when in the predetermined rotational orientation.

16. The blade guard according to claim 11, wherein:

the first blade guard portion comprises a first pair of frustotriangular shaped parallel sidewalls connected by a first planar top surface, a first angled surface extending diagonally downward from a rear edge of the first top surface, and a back wall extending vertically downward from a rear edge of the first angled surface;

the second blade guard portion comprises a second pair of frustotriangular shaped parallel sidewalls connected by a second planar top surface, a second angled surface extending diagonally downward from a front edge of the second top surface, and a front wall extending vertically downward from a front edge of the second angled surface; and the front of the first blade guard portion, comprising font edges of the first pair of sidewalls and a front edge of the first top surface, and a rear of the second blade guard portion, comprising rear edges of the second pair of sidewalls and a rear edge of the second top surface, are brought into contact and cooperate to define a single blade receiving space defined by inner surfaces of the first and second pair of sidewalls, the first and second top surfaces, the first and second angled surfaces, and the front and back walls.

* * * * *